US012140896B2

(12) United States Patent
Okochi et al.

(10) Patent No.: US 12,140,896 B2
(45) Date of Patent: Nov. 12, 2024

(54) IMAGE FORMING APPARATUS

(71) Applicants: Hiroto Okochi, Kanagawa (JP); Atsushi Nagata, Kanagawa (JP)

(72) Inventors: Hiroto Okochi, Kanagawa (JP); Atsushi Nagata, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 71 days.

(21) Appl. No.: 18/144,825

(22) Filed: May 8, 2023

(65) Prior Publication Data

US 2023/0375964 A1 Nov. 23, 2023

(30) Foreign Application Priority Data

May 19, 2022 (JP) ................................ 2022-082622
Mar. 27, 2023 (JP) ................................ 2023-049999

(51) Int. Cl.

*G03G 15/00* (2006.01)
*G03G 15/01* (2006.01)
*G03G 15/16* (2006.01)

(52) U.S. Cl.

CPC ..... *G03G 15/5062* (2013.01); *G03G 15/0131* (2013.01); *G03G 15/1605* (2013.01); *G03G 15/163* (2013.01); *G03G 15/1635* (2013.01); *G03G 15/1645* (2013.01); *G03G 15/1675* (2013.01)

(58) Field of Classification Search

CPC ........... G03G 15/0131; G03G 15/1605; G03G 15/163; G03G 15/1635; G03G 15/1645; G03G 15/1675; G03G 15/5062

See application file for complete search history.

(56) References Cited

U.S. PATENT DOCUMENTS 10,423,114 B2 * 9/2019 Yoshikawa ........ G03G 15/1675
2010/0014903 A1 1/2010 Seto et al.
2010/0232844 A1 9/2010 Saito et al.
2014/0010562 A1 * 1/2014 Tanaka ............... G03G 15/1665 399/66
2014/0328604 A1 11/2014 Tanaka et al.

(Continued)

FOREIGN PATENT DOCUMENTS

JP 2010-072074 4/2010
JP 2012-123309 6/2012

(Continued)

*Primary Examiner* — Joseph S Wong

(74) *Attorney, Agent, or Firm* — Duft & Bornsen, PC

(57) ABSTRACT

An image forming apparatus includes an image bearer, a nip former, a transfer bias supply, and processing circuitry. The nip former to form a transfer nip between the image bearer and the nip former. The transfer bias supply applies a transfer bias in which an alternating current component is superimposed on a direct current component to the transfer nip, to transfer a toner image onto a transfer target object at the transfer nip. The processing circuitry is to execute a processing mode of determining the DC component and the AC component to be used in a print job, based on a plurality of test toner images transferred to the transfer target object under transfer conditions different from each other in combination of the DC component and the AC component while changing the DC component and the AC component.

9 Claims, 8 Drawing Sheets

(56) References Cited

U.S. PATENT DOCUMENTS

| | | | | |
|---|---|---|---|---|
| 2015/0212453 | A1* | 7/2015 | Tanaka | G03G 15/1675 399/66 |
| 2017/0235257 | A1 | 8/2017 | Kochi et al. | |
| 2017/0235258 | A1 | 8/2017 | Wada et al. | |
| 2017/0299987 | A1 | 10/2017 | Sugimoto et al. | |
| 2017/0299994 | A1 | 10/2017 | Nagata et al. | |
| 2017/0300000 | A1 | 10/2017 | Nakamura et al. | |
| 2018/0164720 | A1 | 6/2018 | Nagata et al. | |
| 2019/0025735 | A1 | 1/2019 | Hasegawa et al. | |
| 2020/0379395 | A1 | 12/2020 | Fukao et al. | |
| 2021/0333728 | A1 | 10/2021 | Nagata et al. | |
| 2022/0326637 | A1 | 10/2022 | Koike et al. | |

FOREIGN PATENT DOCUMENTS

| | | |
|---|---|---|
| JP | 2015-138152 | 7/2015 |
| JP | 2021-009346 | 1/2021 |

* cited by examiner

FIG. 4

| RECORDING SHEET | ITEM | SECONDARY TRANSFER BIAS |
|---|---|---|
| PLAIN PAPER SHEET A | MONOCHROME FRONT SURFACE | DC BIAS (DC CURRENT VALUE A) |
| | MONOCHROME BACK SURFACE | DC BIAS (DC CURRENT VALUE B) |
| | FULL-COLOR FRONT SURFACE | DC BIAS (DC CURRENT VALUE C) |
| | FULL-COLOR BACK SURFACE | DC BIAS (DC CURRENT VALUE D) |
| UNEVEN PAPER SHEET A | MONOCHROME FRONT SURFACE | SUPERIMPOSED BIAS (DC CURRENT VALUE E / AC VOLTAGE VALUE α) |
| | MONOCHROME BACK SURFACE | SUPERIMPOSED BIAS (DC CURRENT VALUE F / AC VOLTAGE VALUE β) |
| | FULL-COLOR FRONT SURFACE | SUPERIMPOSED BIAS (DC CURRENT VALUE G / AC VOLTAGE VALUE γ) |
| | FULL-COLOR BACK SURFACE | SUPERIMPOSED BIAS (DC CURRENT VALUE H / AC VOLTAGE VALUE δ) |

| | | AC VOLTAGE (Vpp) (□ < V) | | | | |
|---|---|---|---|---|---|---|
| | SETTING VALUE | def−2 | def−1 | def | def+1 | def+2 |
| DC CURRENT (Iofe) (−μA) | def−10 | T-8 | T-7 | T-6 | T-9 | T-10 |
| | def | T-3 | T-2 | T-1 (PRESENT VALUE) | T-4 | T-5 |
| | def+10 | T-13 | T-12 | T-11 | T-14 | T-15 |

IMAGE FORMING APPARATUS

CROSS-REFERENCE TO RELATED APPLICATIONS

This patent application is based on and claims priority pursuant to 35 U.S.C. § 119(a) to Japanese Patent Application Nos. 2022-082622, filed on May 19, 2022, and 2023-049999, filed on Mar. 27, 2023, in the Japan Patent Office, the entire disclosure of each of which is hereby incorporated by reference herein.

BACKGROUND

Technical Field

Embodiments of the present disclosure relate to an image forming apparatus.

Related Art

An image forming apparatus is known in the art that includes an image bearer, a nip forming member that forms a transfer nip between the image bearer and the nip forming member, and a transfer bias applying unit that applies a transfer bias in which an alternating current component is superimposed on a direct current component to the transfer nip. The image forming apparatus transfers a toner image to a transfer target object at the transfer nip.

SUMMARY

According to an embodiment of the present disclosure, an image forming apparatus includes an image bearer, a nip former, a transfer bias supply, and processing circuitry. The nip former to form a transfer nip between the image bearer and the nip former. The transfer bias supply applies a transfer bias in which an alternating current (AC) component is superimposed on a direct current (DC) component to the transfer nip, to transfer a toner image onto a transfer target object at the transfer nip. The processing circuitry is to execute a processing mode of determining the DC component and the AC component to be used in a print job, based on a plurality of test toner images transferred to the transfer target object under transfer conditions different from each other in combination of the DC component and the AC component while changing the DC component and the AC component.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 4 is a diagram illustrating a data table of a secondary transfer bias stored in a memory, according to an embodiment of the present disclosure;

Figure 1:
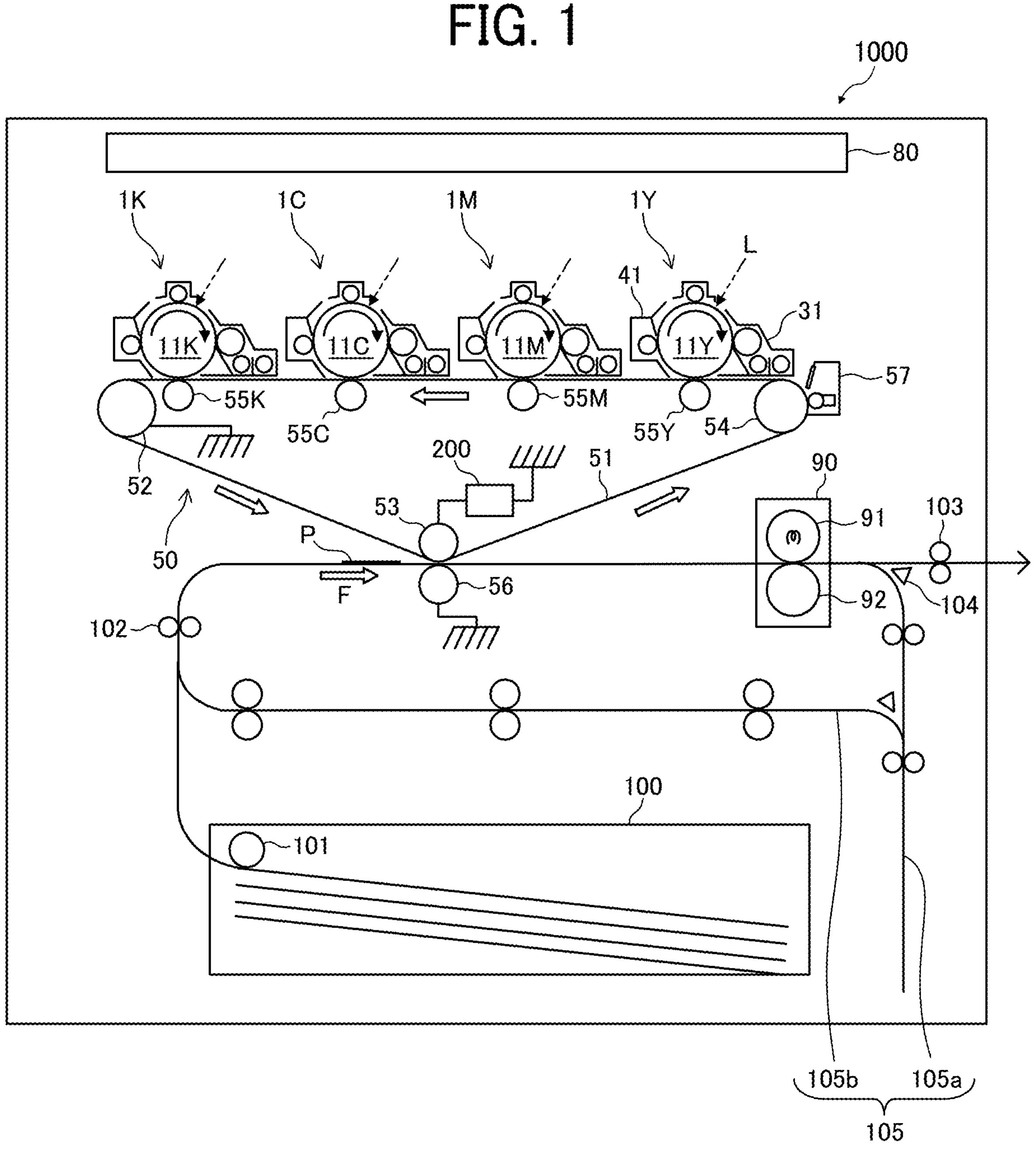
FIG. 1 is a schematic diagram illustrating a configuration of an image forming apparatus illustrated as a printer, according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

Hereinafter, an embodiment of the present disclosure applied to a color laser printer (hereinafter, simply referred to as a printer) that is an image forming apparatus will be described.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure are described below with reference to the drawings.

FIG. 1 is a schematic diagram illustrating a configuration of an image forming apparatus according to an embodiment of the present disclosure.

An image forming apparatus 1000 according to the present embodiment is illustrated as a printer and includes an intermediate transfer belt 51 formed of an endless belt member serving as an image bearer and an intermediate transferor. Four image forming units 1Y, 1M, 1C, and 1K that form toner images of respective colors of yellow (Y), magenta (M), cyan (C), and black (K) are arranged side by side along an upper running side of the intermediate transfer belt 51 to constitute a tandem image forming section.

Since the image forming units 1Y, 1M, 1C, and 1K have the same configuration except for the color of toner to be handled, one image forming unit 1 will be described below with reference to FIG. 2. In the following description, suffixes of Y, M, C, and K indicating the respective colors are omitted as appropriate.

Figure 2:
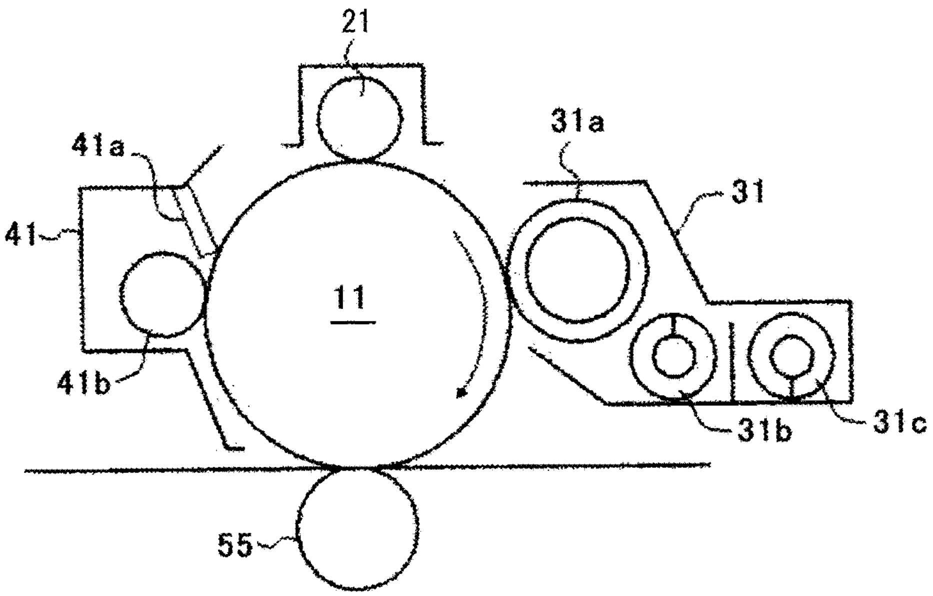
FIG. 2 is a schematic diagram illustrating a configuration of an image forming unit according to an embodiment of the present disclosure.

As illustrated in FIG. 2, the image forming unit 1 includes, for example, a photoconductor drum 11 as a latent image bearer, a charging device 21, a developing device 31, and a cleaning device 41. In the present embodiment, each of the image forming units 1Y, 1M, 1C, and 1K is attachable to and detachable from a body of the image forming apparatus 1000.

The charging device 21 is a charging unit that charges the surface of the photoconductor drum 11 with a charging roller. The developing device 31 is a developing unit that develops and visualizes a latent image on the photoconductor drum 11 with a developer containing toner. The cleaning device 41 is a cleaner to clean the surface of the photoconductor drum 11.

The photoconductor drum 11 has a drum shape in which an organic photosensitive layer is formed on a surface of a drum base, and is rotationally driven in a clockwise direction in FIG. 2 by a driving unit.

The charging device 21 causes electric discharge between the charging roller to which a charging bias is applied and the photoconductor drum 11 while bringing the charging roller into contact with or close to the photoconductor drum 11, to uniformly charge the surface of the photoconductor drum 11.

In the present embodiment, the surface of the photoconductor drum 11 is uniformly charged by the charging device 21 to the negative polarity which is the same as the normal charging polarity of toner. As the charging bias, a bias is employed in which an alternating current (AC) voltage is superimposed on a direct current (DC) voltage. Instead of the method using the charging roller, for example, a method using an electrostatic charger may be employed.

The developing device 31 includes a developing sleeve 31*a* serving as a developer bearer and two screws 31*b* and 31*c* serving as stirrers to stir and convey the developer in a storage vessel in which two-component developer including toner and carriers is stored. As the developing device 31, for example, a developing device using a one-component developer containing toner may be employed.

The cleaning device 41 includes a cleaning blade 41*a* and a cleaning brush roller 41*b*.

The cleaning blade 41*a* contacts the photoconductor drum 11 from a counter direction with respect to the rotation direction of the photoconductor drum 11. The cleaning brush roller 41*b* contacts the photoconductor drum 11 while rotating in a direction opposite to the rotation direction of the photoconductor drum 11. The cleaning blade 41*a* and the cleaning brush roller 41*b* cleans the surface of the photoconductor drum 11.

Above the image forming units 1Y, 1M, 1C and 1K, an optical writing unit 80 as a latent-image writer is disposed to write latent images on the surfaces of the photoconductor drum 11Y, 11M, 11C, and 11K charged by the charging devices 21.

The optical writing unit 80 optically scans the surfaces of the photoconductor drums 11Y, 11M, 11C, and 11K with laser light emitted from a laser diode based on image information sent from an external device such as a personal computer.

By this optical scanning, electrostatic latent images for Y, M, C, and K colors are formed on the surfaces of the photoconductor drums 11Y, 11M, 11C, and 11K. Specifically, in the entire region of the uniformly charged surface of the photoconductor drum 11, the portion irradiated with the laser light attenuates the potential. As a result, the potential of the laser-irradiated portion becomes lower than the potential of the other portion (background portion), resulting in an electrostatic latent image.

The optical writing unit 80 irradiates the surface of the photoconductor drum 11 with the laser light L emitted from the light source via a plurality of optical lenses and mirrors while deflecting the laser light L in the main scanning direction by a polygon mirror rotationally driven by a polygon motor. Alternatively, optical writing may be performed by a light emitting diode (LED) light emitted from a plurality of LEDs of an LED array.

Below the image forming units 1Y, 1M, 1C, and 1K, a transfer unit 50 is disposed as a transfer device that endlessly moves an endless intermediate transfer belt 51 in a counterclockwise direction in FIG. 1 while stretching the intermediate transfer belt 51.

In addition to the intermediate transfer belt 51, the transfer unit 50 includes a driving roller 52, a secondary transfer counter roller 53, a cleaning backup roller 54, four primary transfer rollers 55, a secondary transfer roller 56 serving as a nip forming member, and a belt cleaning device 57.

The intermediate transfer belt 51 is stretched by a driving roller 52, a secondary transfer counter roller 53, a cleaning backup roller 54, and four primary transfer rollers 55Y, 55M, 55C, and 55K, which are disposed inside the loop of the intermediate transfer belt 51. The intermediate transfer belt 51 is endlessly moved in the counterclockwise direction in FIG. 1 by the rotational force of the driving roller 52 which is rotationally driven in the counterclockwise direction in FIG. 1 by the driving unit.

The primary transfer rollers 55Y, 55M, 55C, and 55K nip the endlessly-moving intermediate transfer belt 51 between the primary transfer rollers 55Y, 55M, 55C, and 55K and the photoconductor drums 11Y, 11M, 11C, and 11K. In this manner, primary transfer nips for Y, M, C, and K are formed at which the front surface of the intermediate transfer belt 51 contacts the photoconductor drums 11Y, 11M, 11C, and 11K.

A primary-transfer-bias power supply applies a primary transfer bias to each of the primary transfer rollers 55Y, 55M, 55C, and 55K. As a result, a transfer electric field is formed between the color toner images on the photoconductor drums 11Y, 11M, 11C, and 11K and the primary transfer rollers 55, and the toner images are primarily transferred from the photoconductor drums 11 to the intermediate transfer belt 51 by the action of the transfer electric field and the nip pressure.

The Y toner image, the M toner image, the C toner image, and the K toner image are sequentially superimposed and primarily transferred on the intermediate transfer belt 51. Thus, a four-color superimposed toner image is formed on the intermediate transfer belt 51.

In the case of forming a monochrome image, support plates supporting the primary transfer rollers 55Y, 55M, and 55C for Y, M, and C in the transfer unit 50 are moved to move the primary transfer rollers 55Y, 55M, and 55C away from the photoconductor drums 11Y, 11M, and 11C.

In this manner, the front surface of the intermediate transfer belt 51 is separated from the photoconductor drums 11Y, 11M, and 11C, and the intermediate transfer belt 51 is brought into contact with only the photoconductor drum 11K.

Under the above conditions, among the four image forming units 1Y, 1M, 1C, and 1K, only the image forming unit 1K is driven to form a K toner image on the photoconductor drum 11K.

A primary transfer bias is applied to the primary transfer roller 55. Instead of the primary transfer roller 55, a primary transfer unit using, for example, a transfer charger or a transfer brush may be employed.

The secondary transfer roller 56 as a nip forming member of the transfer unit 50 is disposed outside the loop of the intermediate transfer belt 51, and nips the intermediate transfer belt 51 between the secondary transfer roller 56 and the secondary transfer counter roller 53 inside the loop. As a result, a secondary transfer nip is formed at which the secondary transfer roller 56 contacts the outer surface of the intermediate transfer belt 51.

In the transfer unit 50, a portion where the intermediate transfer belt 51 is nipped between the secondary transfer roller 56 and the secondary transfer counter roller 53 is the secondary transfer nip as a transfer nip where a toner image is transferred from the intermediate transfer belt 51 onto a recording sheet P.

While the secondary transfer roller 56 is electrically grounded, a secondary-transfer-bias power supply 200 serving as a transfer bias applying unit is connected to the secondary transfer counter roller 53, and a secondary transfer bias is applied to the secondary transfer counter roller 53 by the secondary-transfer-bias power supply 200. As a result, a secondary transfer electric field is formed between the secondary transfer counter roller 53 and the secondary transfer roller 56 to electrostatically move toner from the secondary transfer counter roller 53 toward the secondary transfer roller 56.

In some embodiments, the secondary-transfer-bias power supply 200 may be connected to the secondary transfer roller 56, and the secondary transfer counter roller 53 may be electrically grounded.

Below the transfer unit 50, a sheet tray 100 is disposed that accommodates a plurality of recording sheets P as members to be transferred in the form of a bundle of sheets. In the sheet tray 100, a sheet feeding roller 101 is brought into contact with the uppermost recording sheet P of a bundle of sheets, and is rotationally driven at a predetermined timing to feed the recording sheet P toward a sheet feeding path.

A pair of registration rollers 102 is disposed near an end of the sheet feeding path. When the recording sheet P fed from the sheet tray 100 is nipped between the pair of registration rollers 102, the rotation of both rollers of the pair of registration rollers 102 is immediately stopped.

The rotational driving of both rollers of the pair of registration rollers 102 is resumed such that the nipped recording sheet P can be synchronized with the toner image on the intermediate transfer belt 51 in the secondary transfer nip, and the recording sheet P is fed toward the secondary transfer nip.

The toner images on the intermediate transfer belt 51 brought into close contact with the recording sheet P at the secondary transfer nip are collectively secondarily transferred onto the recording sheet P by the action of the secondary transfer electric field and the nip pressure.

When the recording sheet P on which the full-color toner image or the monochrome toner image is formed passes through the secondary transfer nip, the recording sheet P is curvature-separated from the secondary transfer roller 56 and the intermediate transfer belt 51.

A fixing device 90 is disposed on the right side of the secondary transfer nip in FIG. 1. In the fixing device 90, a fixing nip is formed by a fixing roller 91 including a heat generating source such as a halogen lamp and a pressure roller 92 rotating while contacting the fixing roller 91 at a predetermined pressure.

The recording sheet P fed into the fixing device 90 is nipped at the fixing nip in such a posture that the unfixed toner image bearing surface of the recording sheet P is brought into close contact with the fixing roller 91. Toner in the unfixed toner image melts by application of heat and pressure, so that the full-color toner image is fixed to the transfer sheet P.

The recording sheet P having passed through the fixing device 90 reaches a conveyance path switching point by a switching claw 104. The switching claw 104 can switch the conveyance path of the recording sheet P between an ejection path and a return path. At the time of single-sided printing, the recording sheet P ejected from the fixing device 90 is guided toward an ejection path. As a result, the recording sheet P is ejected to the outside of the image forming apparatus 1000 via a pair of ejection rollers 103.

On the other hand, when duplex printing is performed, the recording sheet P discharged from the fixing device 90 is guided toward the return path. The recording sheet P guided to the return path is conveyed to a reverse re-conveying device 105 including a switchback section 105*a* and a re-conveying section 105*b*. The recording sheet P conveyed to the reverse re-conveying device 105 enters the switchback section 105*a*, and the recording sheet P is switched back at the switchback section 105*a*. As a result, the rear end of the recording sheet P is directed forward, and the recording sheet P enters the re-conveying section 105*b* while being turned upside down. The recording sheet P is sent again from the re-conveying section 105*b* toward the sheet feeding path. A toner image is transferred to the second surface of the recording sheet P through a registration nip formed by the pair of registration rollers 102 and the secondary transfer nip, and then the toner image is fixed on the second surface of the recording sheet P in the fixing device 90. The recording sheet P is ejected to the outside of the image forming apparatus 1000 via the pair of ejection rollers 103.

Figure 3:
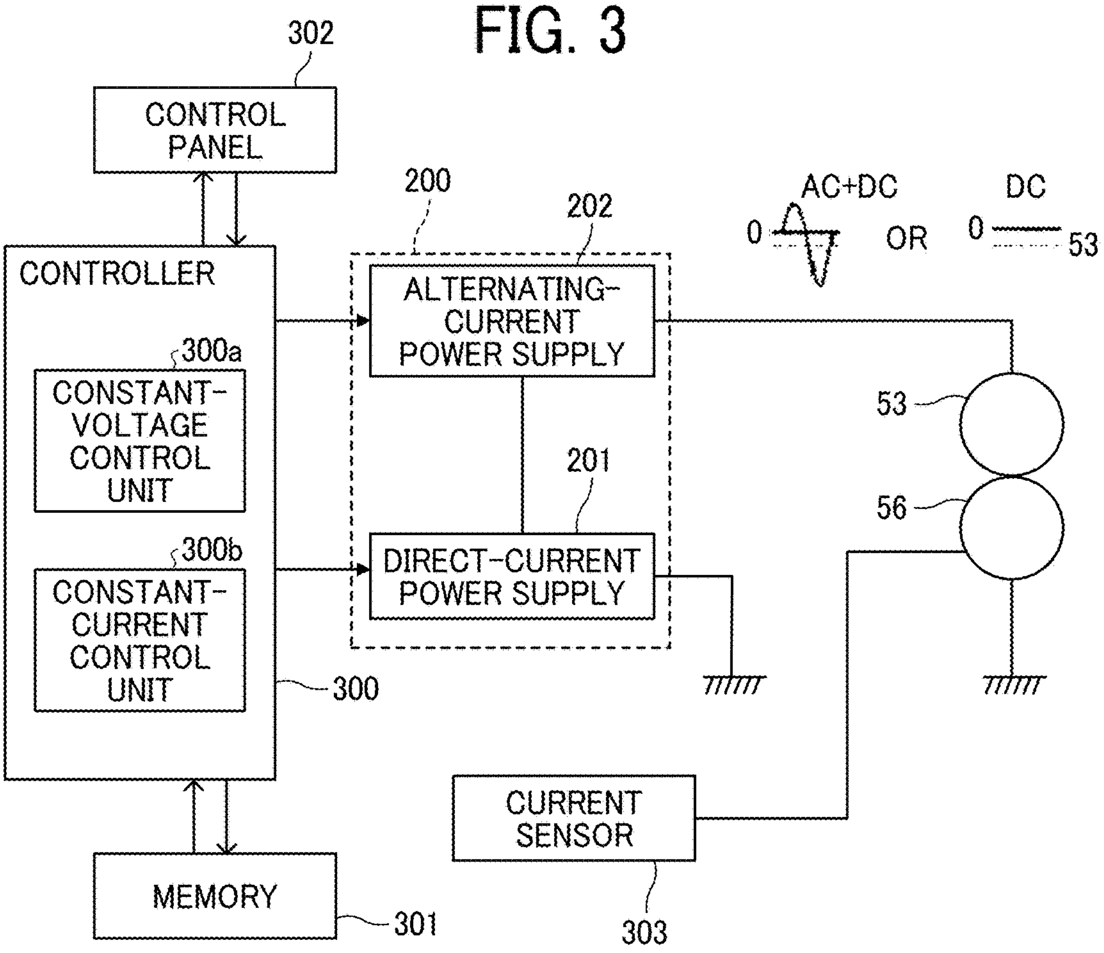
FIG. 3 is a diagram illustrating a power supply configuration of a secondary-transfer-bias power supply including a direct current (DC) power supply and an alternating current (AC) power supply, according to an embodiment of the present disclosure.

FIG. 3 illustrates a power supply configuration of the secondary-transfer-bias power supply 200 included in the image forming apparatus 1000 according to the present exemplary embodiment.

As illustrated in FIG. 3, the secondary-transfer-bias power supply 200 includes a direct current (DC) power supply 201 that outputs a DC component and an alternating current (AC) power supply 202 that outputs a DC component on which an AC component is superimposed. As the secondary transfer bias, a DC component (in the following description, referred to as a DC bias) and a DC component on which an AC component is superimposed (in the following description, referred to as a superimposed bias) can be output.

In the secondary-transfer-bias power supply 200 having such a configuration, when the superimposed bias is output, an output signal is transmitted from a controller 300 serving as a control device to the DC power supply 201 and the AC power supply 202, to apply the superimposed bias to the secondary transfer counter roller 53.

When the DC bias is output, the controller 300 sends a signal only to the DC power supply 201 to apply the DC bias to the secondary transfer counter roller 53.

The controller 300 includes a constant-voltage control unit 300*a* and a constant-current control unit 300*b*. The constant-voltage control unit 300*a* performs pulse width modulation (PWM) constant-voltage control on the AC power supply 202, and the constant-current control unit 300*b* performs PWM constant-current control on the DC power supply 201. Under the constant-current control on the DC component, even if the electric resistance of the intermediate transfer belt 51 or the secondary transfer roller 56 fluctuates due to a temperature environment or a humidity environment, the applied voltage changes accordingly. Thus, the transfer electric field at the secondary transfer nip stabilizes, and stable secondary transfer properties can be obtained.

A nonvolatile memory 301 is coupled to the controller 300. The memory 301 stores the secondary transfer bias to be set in association with each type of the recording sheet. The controller 300 is also coupled to an electric-current sensor 303 that detects an electric current flowing through the secondary transfer nip.

The controller 300 corrects the secondary transfer bias to be output based on the electric current value detected by the electric-current sensor 303 during printing. For example, when the superimposed bias is output, the electric current value is detected by the electric-current sensor 303. The controller 300 obtains a DC current value and an AC current value (peak-to-peak current) based on the electric current value detected by the electric-current sensor 303. When the obtained DC current value is different from a DC current value determined in a secondary-transfer-bias adjustment mode by a predetermined value or more, the DC voltage is corrected based on, for example, information on the type of a recording sheet to be conveyed so that the obtained DC current value matches the DC current value determined in the secondary-transfer-bias adjustment mode. In this manner, the DC current flowing through the secondary transfer nip is maintained at the DC current value determined in the secondary-transfer-bias adjustment mode, which is described below.

The AC voltage output from the AC power supply 202 and the AC voltage actually applied to the secondary transfer nip are different depending on the electric resistance value of the secondary transfer counter roller 53 and the electric resistance value of the secondary transfer roller 56. For this reason, the controller 300 determines the actual AC voltage (peak-to-peak voltage) applied to the secondary transfer nip on the basis of the obtained AC current value. When the obtained AC voltage value is different from the AC current value determined in the secondary-transfer-bias adjustment mode by a predetermined value or more, the AC voltage value output from the AC power supply 202 is corrected based on, for example, the information on the type of a recording sheet to be conveyed so that the AC voltage applied to the secondary transfer nip matches the AC current value determined in the secondary-transfer-bias adjustment mode. In this manner, the AC voltage applied to the secondary transfer nip is maintained at the AC current value determined in the secondary-transfer-bias adjustment mode.

Each function executed by the controller 300 described above and each function executed by the controller 300 described below can be implemented with one or a plurality of processing circuits. The "processing circuit" in the present specification includes a processor programmed to execute functions by software such as a central processing unit (CPU) implemented by an electronic circuit, and a device such as an application specific integrated circuit (ASIC), a digital signal processor (DSP), a field programmable gate array (FPGA), or a conventional circuit module designed to execute each function described above.

FIG. 4 is a data table of the secondary transfer bias stored in the memory 301.

As illustrated in FIG. 4, when the type of the recording sheet is plain paper sheet, the DC bias is stored as the secondary transfer bias. In the present embodiment, since the DC power supply is subjected to constant-current control by the constant-current control unit 300*b*, a DC current value is stored as the DC bias. In the case of a recording sheet having an uneven surface such as an embossed paper sheet (in the following description, referred to as uneven paper sheet), a superimposed bias is stored as the secondary transfer bias. Since the DC power supply is subjected to constant-current control by the constant-current controller 300*b* and the AC power supply 202 is subjected to constant-voltage control by the constant-voltage control unit 300*a*, the memory 301 stores a DC current value and an AC voltage value (peak-to-peak voltage value) as the superimposed bias.

For example, the electric resistance value of a toner image or the thickness of the toner image is different between when the toner image is a full-color toner image transferred to a recording sheet and when the toner image is a monochrome toner image transferred to the recording sheet. For this reason, the optimum secondary transfer conditions are different between when the full-color toner image is secondarily transferred to the recording sheet and when the monochrome toner image is secondarily transferred to the recording sheet. Furthermore, when a recording sheet is heated by the fixing device 90 and moisture contained in the recording sheet evaporates, the electric resistance of the recording sheet may be different between when a toner image is secondarily transferred to the front surface of the recording sheet and when the toner image is secondarily transferred to the back surface of the recording sheet. As a result, the optimum secondary transfer conditions are different between when the toner image is secondarily transferred to the front surface of the recording sheet and when the toner image is secondarily transferred to the back surface of the recording sheet.

In the present embodiment, as illustrated in FIG. 4, four secondary transfer biases are stored in association with one type of recording sheet. Specifically, as illustrated in FIG. 4, a secondary transfer bias used when a monochrome toner image is secondarily transferred to the front surface of a recording sheet, a secondary transfer bias used when a monochrome toner image is secondarily transferred to the back surface of the recording sheet, a secondary transfer bias used when a full-color toner image is secondarily transferred to the front surface of the recording sheet, and a secondary transfer bias used when a full-color toner image is secondarily transferred to the back surface of the recording sheet are stored in association with the recording sheet.

As described above, in the present embodiment, the secondary transfer bias is set for all combinations of monochrome and full color and the front surface and back surface of recording sheet for which the optimum secondary transfer conditions are different from each other. With such a configuration, good images can be obtained in all combinations of monochrome and full color and the front surface and back surface of recording sheet.

At an initial stage of use of the image forming apparatus 1000, a default secondary transfer bias is associated with each recording sheet, and the default secondary transfer bias stored in association with each recording sheet is rewritten to a secondary transfer bias determined in the secondary-transfer-bias adjustment mode, which is described below.

Information on the type of recording sheet loaded in the sheet tray 100 is stored in the memory 301.

A control panel 302 as an information input device is connected to the controller 300. The control panel 302 includes a touch screen 302*a* and operation buttons 302*b*

Figure 9:
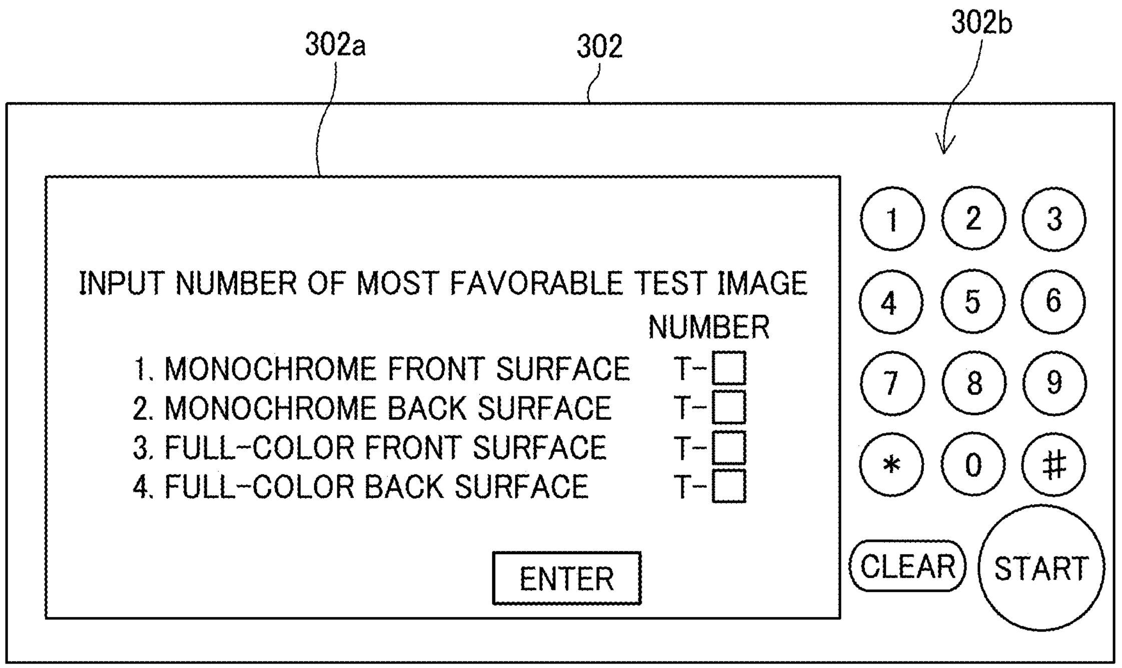
FIG. 9 is a diagram illustrating an input screen displayed on a control panel, according to an embodiment of the present disclosure.

(see FIG. 9). The user inputs the type information of the recording sheet loaded in the sheet tray 100 using the control panel 302, and the controller 300 stores the input type information of the recording sheet loaded in the sheet tray 100 in the memory 301.

At the time of a print job for forming a desired image on a recording sheet, the controller 300 reads out the type information of the recording sheet loaded in the sheet tray 100 from the memory 301. The controller 300 also determines whether the image to be printed is a monochrome image or a full-color image. Based on the read sheet type information and image information to be printed, the controller 300 reads a corresponding secondary transfer condition from the data table of the secondary transfer bias illustrated in FIG. 4 stored in the memory 301.

In the case of a plain paper sheet, the AC power supply 202 is turned off, and the constant-current controller 300*b* performs PWM constant-current control on the DC power supply 201 so that a DC current of the read DC current value flows to the secondary transfer counter roller 53. On the other hand, in the case of an uneven paper sheet, the constant-voltage control unit 300*a* performs PWM constant-voltage control on the AC power supply 202 so that the read AC voltage value is applied to the secondary transfer counter roller 53. The constant-current controller 300*b* performs PWM constant-current control on the DC power supply 201 so that the DC current of the read DC current value flows to the secondary transfer counter roller 53.

When a toner image is secondarily transferred to an uneven paper sheet, a superimposed bias in which an AC component is superimposed on a DC component is applied to the secondary transfer counter roller 53, so that a sufficient amount of toner can be transferred to concaves of the uneven surface of the uneven paper sheet. As a result, the occurrence of a light and shade pattern following the uneven surface can be prevented. On the other hand, in the case of the plain paper sheet, the occurrence of transfer dust particles can be reduced using a secondary transfer bias having only a DC component without an AC component that may cause the transfer dust.

The optimum values of the AC component and the DC component of the secondary transfer bias may shift due to deterioration of toner, a change in electrical resistance of members forming the secondary transfer nip, such as the intermediate transfer belt and the secondary transfer roller, or environment. For this reason, in the present embodiment, the secondary-transfer-bias adjustment mode is performed, and the secondary transfer bias can be changed to an optimum DC current value or a combination of an optimum DC current value and an optimum AC voltage value.

Figures 5, 6:
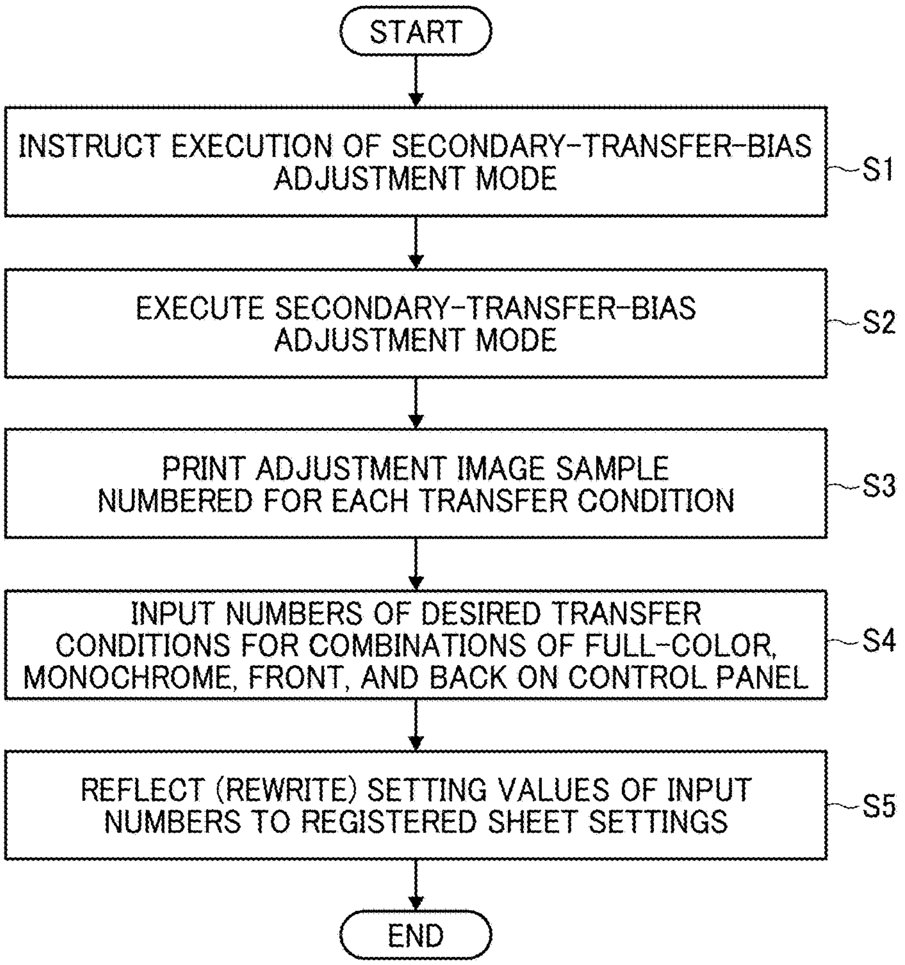
FIG. 5 is a flowchart of execution of a secondary-transfer-bias adjustment mode, which is a processing mode, according to an embodiment of the present disclosure.
FIG. 6 is a table illustrating secondary transfer conditions when respective test toner images are secondarily transferred to an uneven paper sheet, according to an embodiment of the present disclosure.

FIG. 5 is a flowchart of execution of the secondary-transfer-bias adjustment mode, which is a processing mode.

First, execution of the secondary-transfer-bias adjustment mode is instructed (step S1). For example, the user operates the control panel 302 to instruct execution of the secondary-transfer-bias adjustment mode. Alternatively, the instruction of execution of the secondary-transfer-bias adjustment mode may be issued when the type information of the recording sheet loaded in the sheet tray 100 is input from a sheet setting screen displayed on the control panel 302. In such a case, when the user inputs the type information of the recording sheet, a screen inquiring whether to execute the secondary-transfer-bias adjustment mode is displayed on the control panel 302. When the user selects execution of the secondary-transfer-bias adjustment mode, the secondary-transfer-bias adjustment mode may be executed. When the user selects not to execute the secondary-transfer-bias adjustment mode, the secondary transfer is performed using the secondary transfer bias corresponding to the recording sheet stored in the memory 301.

In addition, a display prompting execution of the secondary-transfer-bias adjustment mode may be displayed on the control panel 302 when the optimum value of the secondary transfer bias is likely to change, such as when the power is turned on, every time a predetermined number of sheets are printed, or when the environment changes.

In response to the instruction to execute the secondary-transfer-bias adjustment mode, the controller 300 executes the secondary-transfer-bias adjustment mode (S2). First, the controller 300 reads, from the memory 301, a secondary transfer bias corresponding to a recording sheet to which a test image is to be transferred. Subsequently, the controller 300 uses the read secondary transfer bias as a default to change the secondary transfer bias within a predetermined range, and forms a plurality of test images on the recording sheet under different secondary transfer conditions.

FIG. 6 is a table illustrating secondary transfer conditions when each test toner image is secondarily transferred to an uneven paper sheet, according to an embodiment of the present disclosure.

As illustrated in FIG. 6, the DC current is changed by ±10 μA with respect to the currently-set DC current value. For example, a test toner image is secondarily transferred to a recording sheet while the DC current value is changed to three setting values of a current setting value (def), a DC current value (def+10) of +10 μA with respect to the current setting value, and a DC current value (def−10) of −10 μA with respect to the current setting value. In the above description, the amount of change in the DC current is 10 μA and the range of change in the DC current is ±10 μA. However, the amount of change and the range of change may be determined as appropriate based on the configuration of the image forming apparatus 1000 or the allowable image quality level.

On the other hand, the AC voltage (peak-to-peak voltage Vpp) is changed by ±2.0 kV with respect to the currently-set AC voltage value. For example, a test toner image is secondarily transferred to a recording sheet while the AC voltage is changed to five setting values of a current setting value (def), an AC voltage value (def+1) of +1.0 kV with respect to the current setting value, an AC voltage value (def−1) of −1.0 kV with respect to the current setting value, an AC voltage value (def−2) of −2.0 kV with respect to the current setting value, and an AC voltage value (def+2) of +2.0 kV with respect to the current setting value. in the above description, the amount of change in the AC voltage is 1.0 kV and the range of change in the AC voltage is ±2.0 kV. The amount of change and the range of change may be determined as appropriate based on the configuration of the image forming apparatus 1000 or the allowable image quality level.

When the secondary transfer bias (superimposed bias) corresponding to an uneven paper sheet is adjusted, both the AC voltage and the DC current are changed, and a test toner image is transferred under fifteen transfer conditions illustrated in FIG. 6. As a result, when the secondary transfer bias (superimposed bias) corresponding to the uneven paper sheet is adjusted, a total of fifteen test images are formed. The reference codes of T-1 to T-15 illustrated in FIG. 6 indicate numbers of test images when the secondary transfer bias corresponding to the uneven paper sheet is set. For example, the secondary transfer condition of the first test image to be formed first corresponds to T-1 in FIG. 6 and is the currently-set secondary transfer bias (i.e., superimposed bias: transfer current value and AC voltage value). For example, the fifth test image corresponds to T-5 in FIG. 6, and the secondary transfer condition of the fifth test image is a secondary transfer condition of the combination of the currently-set DC current value (def) and an AC voltage value (def+2) of +2.0 kV with respect to the currently-set AC voltage value.

When the secondary transfer bias (DC bias) corresponding to the plain paper sheet is adjusted, only the DC current is changed without the AC component, so that a test toner image is transferred under three transfer conditions. As a result, when the secondary transfer bias (superimposed bias) corresponding to the plain paper sheet is adjusted, a total of three test images are formed. The amount of change or the range of change in the DC current may be different between the case of the plain paper sheet and the case of the uneven paper sheet. For example, the set value of the DC current may be larger in the case of the plain paper sheet than in the case of the uneven paper sheet.

Figure 7:
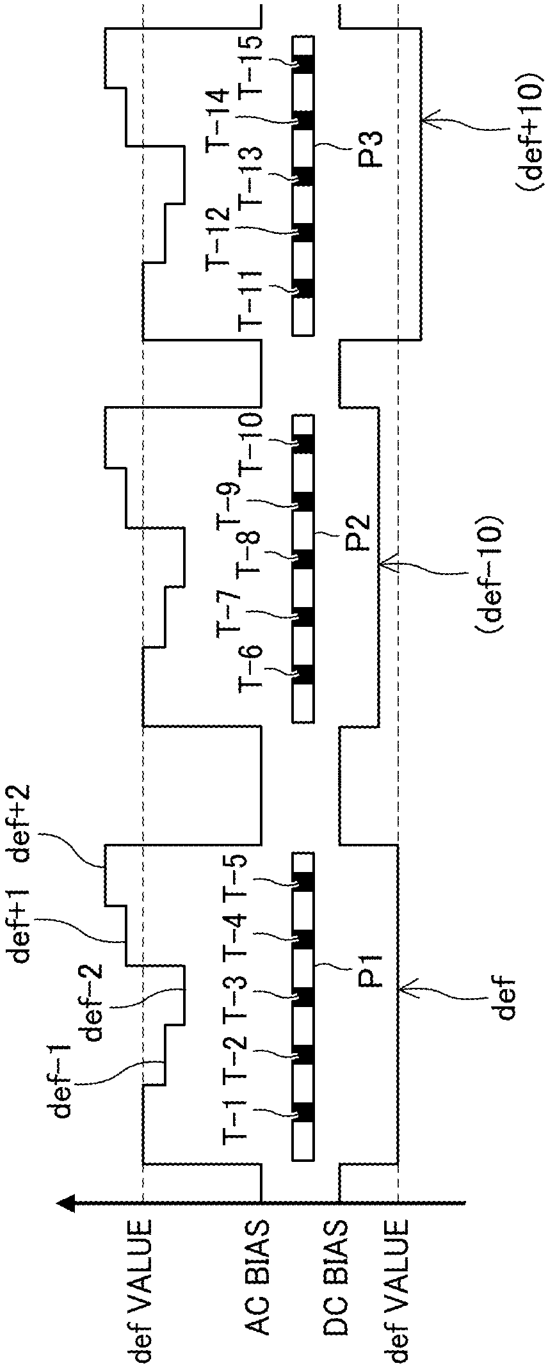
FIG. 7 is a timing chart illustrating changes in an AC voltage and a DC current in a secondary-transfer-bias adjustment mode in a case where a secondary transfer bias corresponding to an uneven paper sheet is set.

FIG. 7 is a timing chart illustrating changes in the AC voltage and the DC current in the secondary-transfer-bias adjustment mode when the secondary transfer bias corresponding to the uneven paper sheet is set.

As illustrated in FIG. 7, in the present embodiment, a total of fifteen test images are formed on three recording sheets, which uneven paper sheets, under different secondary transfer conditions. As illustrated in FIG. 7, five test images are formed on one recording sheet. First to fifth test images are formed on a first recording sheet P1. Sixth to tenth test images are formed on a second recording sheet P2. Eleventh to fifteenth test images are formed on a third recording sheet P3.

As illustrated in FIG. 7, the DC current is changed for each recording sheet and the AC voltage is changed in the same manner for each recording sheet, and the test toner image is transferred under the fifteen transfer conditions illustrated in FIG. 6. The method of changing the DC current and the AC voltage is not limited to the method illustrated in FIG. 7. Based on the detection result of the electric-current sensor 303, the controller 300 controls the DC voltage output from the DC power supply so that the DC current flowing through the secondary transfer nip matches the DC current to be changed. Based on the detection result of the electric-current sensor 303, the controller 300 also controls the AC voltage output from the AC power supply 202 so that the AC voltage applied to the secondary transfer nip matches the AC voltage to be changed.

Figure 8A:
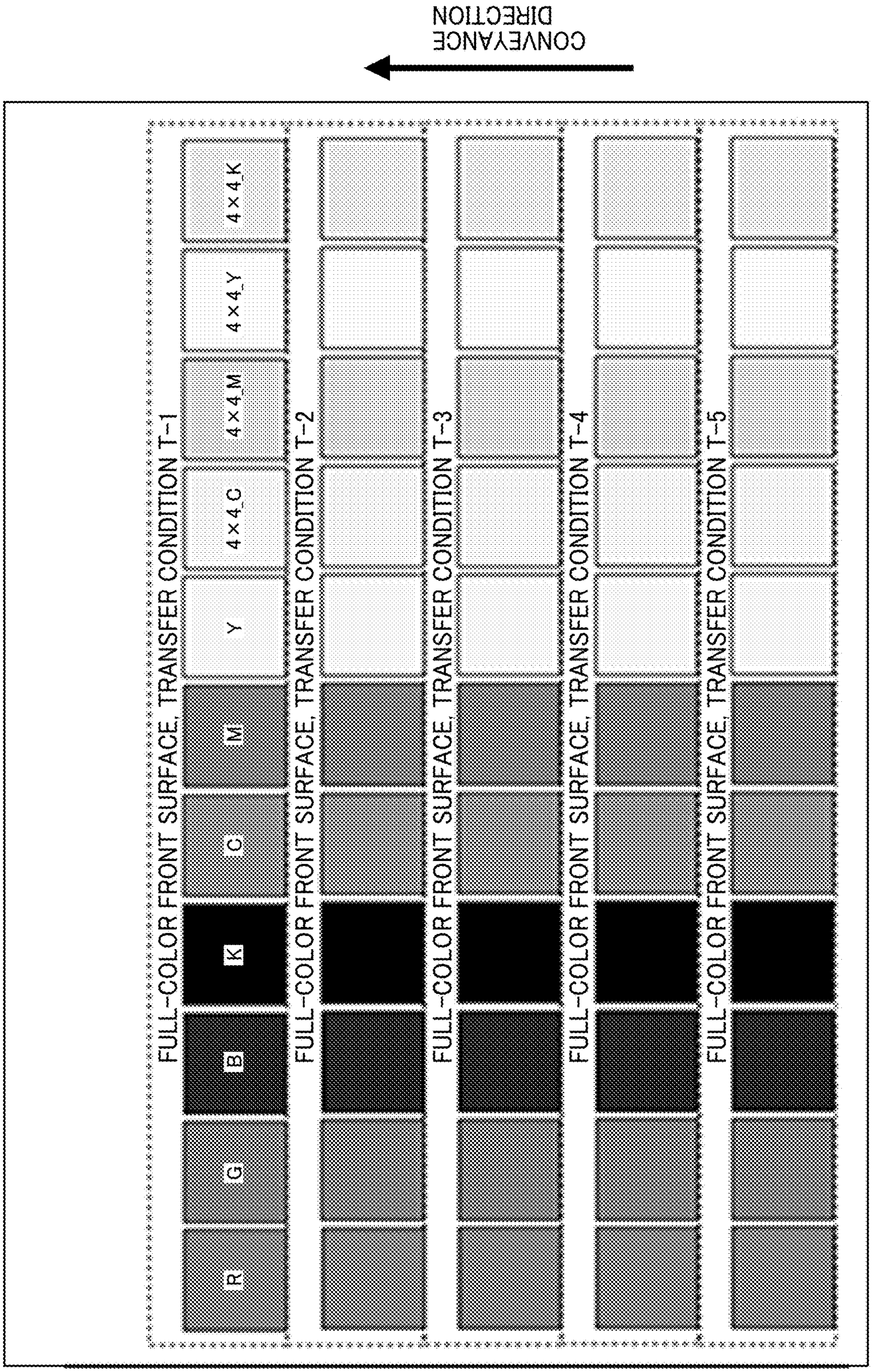
FIG. 8A is a diagram illustrating full-color test images formed on an uneven paper sheet, according to an embodiment of the present disclosure.
Figure 8B:
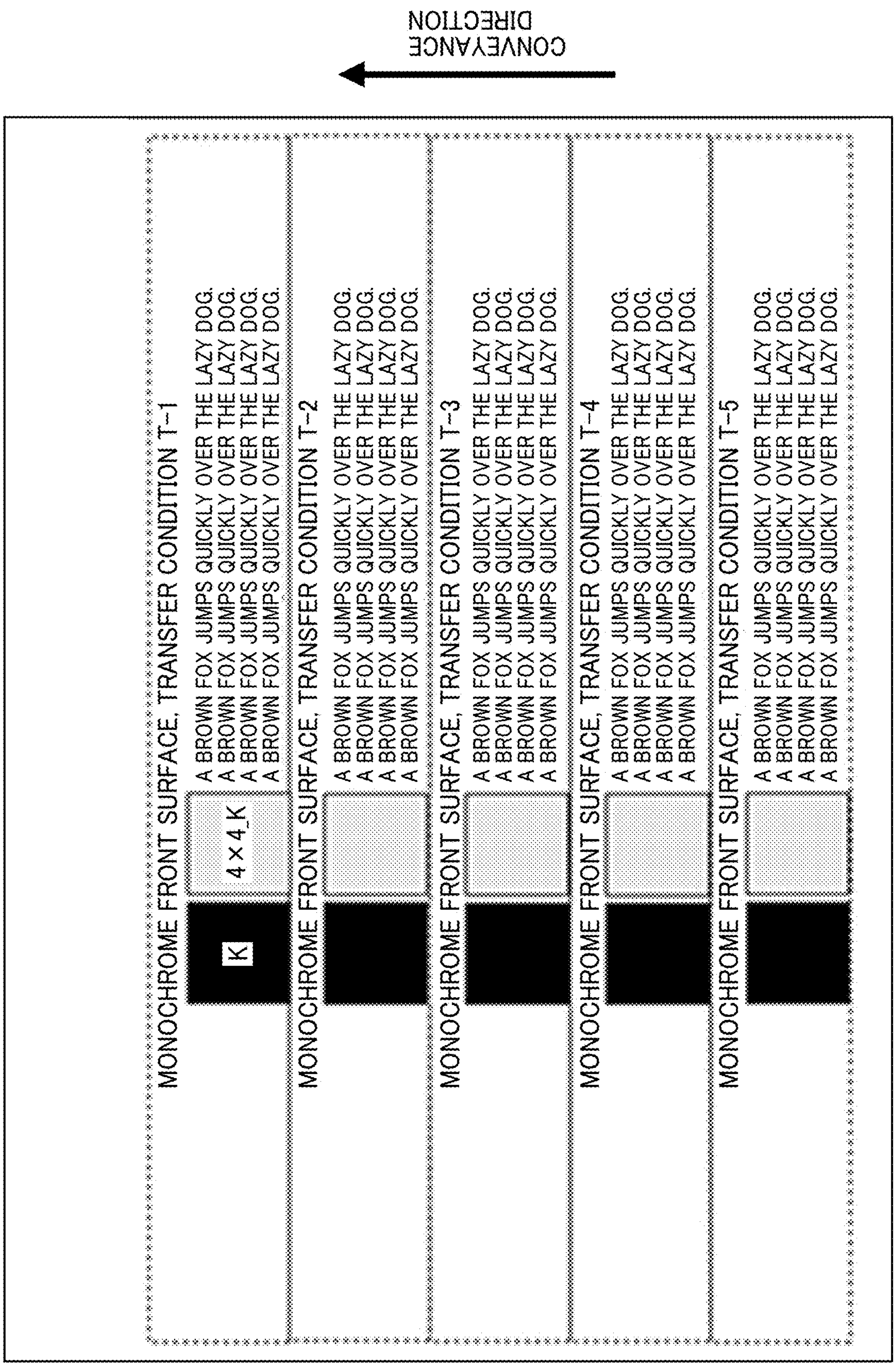
FIG. 8B is a diagram illustrating monochrome test images formed on an uneven paper sheet, according to an embodiment of the present disclosure.

FIGS. 8A and 8B are diagrams illustrating examples of test images formed on an uneven paper sheet.

FIG. 8A illustrates a test image (in the following description, referred to as a full-color test image) for determining the secondary transfer bias used when a full-color toner image is transferred. FIG. 8B illustrates a test image (in the following description, referred to as a monochrome test image) for determining the secondary transfer bias used when a monochrome toner image is transferred.

As illustrated in FIG. 8A, in the full-color test image, solid images of red, green, blue, black, cyan, magenta, and yellow and halftone images of cyan, magenta, yellow, and black are formed side by side in the width direction of a recording sheet in this order from the left side in FIG. 8A. The reference code of the test image and the item of the secondary transfer bias to be set are printed above each test image. In FIG. 8A, the term "FULL-COLOR FRONT SURFACE" is printed as the item of the secondary transfer bias to be set, and "FULL-COLOR BACK SURFACE" is printed on the back surface of an uneven paper sheet as the item of the secondary transfer bias to be set.

As illustrated in FIG. 8B, in the monochrome test image, a solid black image, a halftone image, and a character image are formed side by side in the width direction of a recording sheet from the left side in FIG. 8B. The reference code of the test image and the term "MONOCHROME FRONT SURFACE" as the item of the secondary transfer bias to be set are also printed above each test image. When the monochrome test image is formed on the back surface of the uneven paper sheet, the term "MONOCHROME BACK SURFACE" is printed as the item of the secondary transfer bias to be set.

In the present embodiment, first, the superimposed bias (DC current value and AC voltage value) of the monochrome front surface associated with a conveyed uneven paper sheet is read from the memory 301. The first to fifth monochrome test images (see FIG. 8B) are formed on the front surface of a first uneven paper sheet with the DC current value and the AC voltage value as defaults. Subsequently, the uneven paper sheet is conveyed to the reverse re-conveying device 105, and the superimposed bias (DC current value and AC voltage value) of the monochrome back surface associated with the uneven paper sheet is read from the memory 301. The first to fifth monochrome test images are formed on the back surface of a first uneven paper sheet with the read DC current value and AC voltage value of the superimposed bias of the monochrome back surface as defaults. Above each test image, the term "MONOCHROME BACK SURFACE" is printed as the item of the secondary transfer bias to be set.

Subsequently, a second uneven paper sheet is conveyed, and the sixth to tenth test images are formed on the front surface of the second uneven paper sheet with the superimposed bias of the monochrome front surface stored in the memory 301 as a default. Then, the sixth to tenth test images are formed on the back surface of the second uneven paper sheet with the superimposed bias of the monochrome back surface stored in the memory 301 as a default. Similarly, the eleventh to fifteenth monochrome test images are formed on each of the front surface and the back surface of a third uneven paper sheet.

Subsequently, a fourth uneven paper sheet is conveyed, and the first to fifth full-color test images are formed on the front surface of the fourth uneven paper sheet with the superimposed bias of the full-color front surface stored in the memory 301 as a default. Then, the first to fifth full-color test images are formed on the back surface of the fourth uneven paper sheet with the superimposed bias of the full-color back surface stored in the memory 301 as a default. At this time, "FULL-COLOR BACK SURFACE" is printed as the item of the secondary transfer bias to be set above each test image.

Similarly, the sixth to tenth full-color test images are formed on each of the front surface and the back surface of a fifth uneven paper sheet, and the eleventh to fifteenth full-color test images are formed on each of the front surface and the back surface of a sixth uneven paper sheet. In the above description, the full-color test images are formed after the monochrome test images are formed. However, in some embodiments, the monochrome test images may be formed after the full-color test images are formed.

When a total of six uneven paper sheets on which test images are formed are output in this way, the controller 300 displays an input screen as illustrated in FIG. 9 on the touch screen 302*a* of the control panel 302 (step S4 in FIG. 5).

The user selects a test image having a desired image quality from among the first to fifteenth monochrome test images formed on the front surfaces of the output three uneven paper sheets, and inputs the number of the selected test image as evaluation information to the input field corresponding to “1. MONOCHROME FRONT SURFACE” illustrated in FIG. 9. Similarly, a test image having a desired image quality is selected from among the first to fifteenth monochrome test images formed on the back surfaces of the output three uneven paper sheets, and the number of the selected test image is input as evaluation information to the input field corresponding to “2. MONOCHROME BACK SURFACE” illustrated in FIG. 9.

For the full color, similarly, the number of a test image having a desired image quality from among the first to fifteenth full-color test images formed on the front surface of an uneven paper sheet and the number of a test image having a desired image quality from among the first to fifteen full-color test images formed on the back surface of the uneven paper sheet are input as the evaluation information.

When the numbers of the test images are input to all the input fields, the enter button on the input screen can be pressed. When the enter button is pressed, the controller 300 rewrites the superimposed bias (DC current value and AC voltage value) of each item (see FIG. 4) corresponding to the uneven paper sheet on which the test images are formed, based on the number of the test image input as the evaluation information (step S6 in FIG. 5). Specifically, the superimposed biases (DC current values and AC voltage values) of the monochrome front surface, the monochrome back surface, the full-color front surface, and the full-color back surface are rewritten.

In the secondary-transfer-bias adjustment mode of the present embodiment, when the secondary transfer bias (superimposed bias) is adjusted with respect to the uneven paper sheet, both the DC current and the AC voltage are changed, and a plurality of test images are formed on the uneven paper sheet under transfer conditions in which combinations of the DC component and the AC component are different from each other. As a result, the user can find the combination of the DC current and the AC voltage with the best image quality from the plurality of test images formed on the uneven paper sheet. Such a configuration allows the user to find a more suitable combination of a DC component and an AC component than in the case where the DC current and the AC voltage to be used at the time of a print job are determined separately. Thus, a higher quality image can be obtained.

Further, in the configuration where the DC current and the AC voltage used at the time of the print job are separately determined, the user needs to select a test image having the best image quality for each of the DC current and the AC voltage and input the selected test image to the control panel. In the present embodiment, test images are selected for four items of the monochrome front surface, the monochrome back surface, the full-color front surface, and the full-color back surface. For this reason, in the configuration where the DC current and the AC voltage are determined separately, the user needs to select a test image having a desired image quality and input the number of the selected test image eight times in total. On the other hand, in the present embodiment, the selection of the test image having the desired image quality and the input of the number of the selected test image are performed only four times, and the burden on the user can be reduced as compared with the case where the DC current and the AC voltage are determined separately.

Further, in the present embodiment, a desired test image is selected for the four items of the monochrome front surface, the monochrome back surface, the full-color front surface, and the full-color back surface, and the combination of the DC current and the AC voltage is determined for each of the four items. As a result, full-color single-sided printing, full-color double-sided printing, monochrome single-sided printing, and monochrome double-sided printing can be performed with desired image qualities of the user.

When the recording sheet to be conveyed is a plain paper sheet, the plurality of monochrome test images illustrated in FIG. 8B and the plurality of full color test images illustrated in FIG. 8A are formed on each of the front surface and the back surface of a plurality of plain paper sheets under secondary transfer conditions in which the DC current values are different from each other. As described above, based on the input screen of FIG. 9 displayed on the touch screen 302*a* of the control panel 302, the number of the test image having the desired image quality is input for each of the four items of the monochrome front surface, the monochrome back surface, the full-color front surface, and the full-color back surface. Then, based on the input number of the test image, the controller 300 rewrites the DC bias (DC current value) of the four items (see FIG. 4) corresponding to the plain paper sheet on which the test images are formed.

In the secondary-transfer-bias adjustment mode, the secondary transfer bias is adjusted for all the four items of the monochrome front surface, the monochrome back surface, the full-color front surface, and the full-color back surface. In some embodiments, however, the user may be allowed to select an item for adjusting the secondary transfer bias. As a result, for example, in a case where there is no problem with the image quality of the monochrome image but there is dissatisfaction with the image quality of the full color image, the secondary transfer bias can be adjusted for two items of the full-color front surface and the full-color back surface. In addition, for example, before monochrome single-sided printing is continuously performed, the secondary transfer bias can be adjusted only for the item of the monochrome front surface. As a result, the down time of the image forming apparatus 1000 due to the execution of the secondary-transfer-bias adjustment mode can be reduced as compared with the case where the secondary transfer bias is adjusted for all of the four items of the monochrome front surface, the monochrome back surface, the full-color front surface, and the full-color back surface. In addition, the consumption of the recording sheet can be reduced.

In the above-description, a full-color image forming apparatus has been described as an example of an image forming apparatus according to some embodiments of the present disclosure. In other embodiments, the image forming apparatus may be a monochrome image forming apparatus. In the case of a monochrome image forming apparatus, the secondary transfer bias is set for two items of monochrome front surface and monochrome back surface.

The configurations according to the above-descried embodiments are examples, and embodiments of the present disclosure are not limited to the above-described examples. For example, the following aspects can achieve effects described below.

Now, a description is given of a first aspect.

An image forming apparatus such as the image forming apparatus 1000 includes an image bearer such as the intermediate transfer belt 51, a nip former such as the secondary transfer roller 56 to form a transfer nip such as the secondary transfer nip with the image bearer, and a transfer bias supply such as the secondary-transfer-bias power supply 200 to apply a transfer bias such as the secondary transfer bias in which an alternating current (AC) component is superimposed on a direct current (DC) component to the transfer nip, to transfer a toner image onto a transfer target object such as a recording sheet at the transfer nip. The image forming apparatus includes a controller such as the controller 300 to execute a processing mode such as the secondary-transfer-bias adjustment mode of determining the DC component and the AC component to be used in a print job, based on a plurality of test toner images transferred to the transfer target object under transfer conditions in which combinations of the DC component and the AC component are different from each other while changing the DC component and the AC component.

According to this configuration, both the DC component and the AC component are changed, and a plurality of test toner images are transferred to a transfer target object under transfer conditions in which combinations of the DC component and the AC component are different from each other. As a result, the combination of the DC component and the AC component having the best image quality can be found from the plurality of test toner images formed on the transfer target object. As a result, a more suitable combination of the DC component and the AC component can be found and a higher quality image can be obtained, as compared with the method in which the DC component and the AC component to be used in the print job are determined separately.

Now, a description is given of a second aspect.

The image forming apparatus according to the first aspect further includes a constant-current control unit such as the constant-current control unit 300*b* to perform constant-current control on the DC component such that a DC current flowing through the transfer nip such as the secondary transfer nip is constant when the toner image is transferred to the transfer target object such as a recording sheet, and a constant-voltage control unit such as the constant-voltage control unit 300*a* to perform constant-voltage control on the AC component such that a peak-to-peak voltage applied to the transfer nip is constant when the toner image is transferred to the transfer target object. The controller such as the controller 300 performs control such that the plurality of test toner images are transferred to the transfer target object under transfer conditions in which combinations of DC current values and peak-to-peak voltage values are different from each other, while changing the DC current and the peak-to-peak voltage in the processing mode such as the secondary-transfer-bias adjustment mode, and determines a DC current value and a peak-to-peak voltage value to be used in the print job by the processing mode.

According to this configuration, as described in the above-described embodiment, the DC component is subjected to constant-current control at the DC current value determined by the processing mode, and the AC component is subjected to constant-voltage control at the peak-to-peak voltage value of, for example, the AC voltage determined by the processing mode. As a result, an image of good image quality can be obtained.

Now, a description is given of a third aspect.

The image forming apparatus according to the second aspect includes an electric-current sensor such as the electric-current sensor 303 to detect a current flowing through the transfer nip such as the secondary transfer nip. The constant-current controller such as the constant-current controller 300*b* and the constant-voltage controller such as the constant-voltage control unit 300*a* are controlled based on a detection result of the electric-current sensor.

With this configuration, during the transfer of the toner image to the transfer target object, a predetermined peak-to-peak voltage such as an AC voltage or a predetermined DC current value can be output to the secondary transfer nip.

Now, a description is given of a fourth aspect.

In the image forming apparatus according to any one of the first to third aspects, the transfer target object is a recording sheet, and a plurality of test toner images having different transfer conditions are formed along a conveyance direction of the recording sheet.

According to this configuration, a transfer condition under which the best image quality is obtained can be found from the plurality of test toner images formed on the recording sheet.

Now, a description is given of a fifth aspect.

The image forming apparatus according to any one of the first to fourth aspects includes an information input device such as the control panel 302 for a user to input information. The controller such as the controller 300 determines the DC component and the AC component to be used in the print job, based on evaluation information (in the above-described embodiment, a reference code of a test image having a desired image quality for the user) of the plurality of test toner images input to the information input device by the user who evaluates image qualities of the plurality of test toner images transferred on the recording sheet, in the processing mode such as the secondary-transfer-bias adjustment mode.

According to this configuration, as described in the above-described embodiment, the desired image quality of the user can be obtained.

Now, a description is given of a sixth aspect.

In the image forming apparatus according to any one of the first to fifth aspects, the image bearer is an intermediate transferor such as the intermediate transfer belt 51 to which the toner image is primarily transferred from a latent image bearer such as the photoconductor drum 11.

According to this configuration, the secondary transfer from the intermediate transfer body such as the intermediate transfer belt 51 to the transfer target object such as the recording sheet can be performed by the combination of the AC component and the DC component that can obtain a good image quality.

Now, a description is given of a seventh aspect.

In the image forming apparatus according to any one of the first to sixth aspects, the transfer target object is a recording sheet, and the controller such as the controller 300 determines whether the transfer bias to be used in the print job is the transfer bias in which the AC component is superimposed on the DC component or a transfer bias including only the DC component, according to a type of the recording sheet. When the recording sheet used in the processing mode such as the secondary transfer bias adjustment mode is a recording sheet such as plain paper for which the transfer bias including only the DC component is used in a print job, the controller such as the controller 300 turns off the AC component in the processing mode, performs control such that the plurality of test toner images are transferred to the recording sheet under transfer conditions different from each other in only the DC component, and determines only a DC current value to be used in the print job.

According to this configuration, as described in the above-described embodiment, an image formed on the transfer target object such as a plain paper sheet in which the transfer bias including only the DC component is used in the print job can have excellent image quality.

Now, a description is given of an eighth aspect.

In the image forming apparatus according to any one of the first to seventh aspects, the controller such as the controller 300 controls a plurality of full-color test toner images and a plurality of monochrome test toner images to be transferred to the transfer target object under the transfer conditions in which the combinations of the DC component and the AC component are different from each other in the processing mode such as the secondary-transfer-bias adjustment mode. In the processing mode, the controller such as the controller 300 determines a DC component and an AC component to be used in a full-color print job, based on the plurality of full-color test toner images, and determines a DC component and an AC component to be used in a monochrome print job, based on the plurality of monochrome test toner images.

According to this configuration, as described in the above-described embodiment, both a full-color image and a monochrome image can be obtained with excellent image quality.

Now, a description is given of a ninth aspect.

In the image forming apparatus according to the eighth aspect, in the processing mode such as the secondary-transfer-bias adjustment mode, the controller such as the controller 300 forms the plurality of full-color test toner images on the front surface and the back surface of the transfer target object, determines a DC component and an AC component to be used when a full-color toner image is transferred on a front surface of a transfer target object, based on the full-color test toner images on the front surface of the transfer target object, determines a DC component and an AC component to be used when a full-color toner image is transferred on a back surface of the transfer target object, based on the full-color test toner images on the back surface of the transfer target object, and determines a DC component and an AC component to be used when a monochrome toner image on a front surface of a transfer target object, based on the monochrome test toner images on the front surface of the transfer target object, and determines a DC component and an AC component to be used when a monochrome toner image is transferred on a back surface of the transfer target object, based on the monochrome test toner images on the back surface of the transfer target object.

As described in the above-described embodiment, such a configuration can obtain excellent image qualities of a full-color image and a monochrome image formed on the front surface and the back surface of a transfer target object such as the recording sheet.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image forming apparatus, comprising:

an image bearer;

a nip former to form a transfer nip between the image bearer and the nip former;

a transfer bias supply to apply a transfer bias in which an alternating current (AC) component is superimposed on a direct current (DC) component to the transfer nip, to transfer a toner image onto a transfer target object at the transfer nip; and processing circuitry to execute a processing mode of determining the DC component and the AC component to be used in a print job, based on a plurality of test toner images transferred to the transfer target object under transfer conditions different from each other in combination of the DC component and the AC component while changing the DC component and the AC component.

2. The image forming apparatus according to claim 1, wherein the processing circuitry is to:

perform constant-current control on the DC component such that a DC current flowing through the transfer nip is constant when the toner image is transferred to the transfer target object;

perform constant-voltage control on the AC component such that a peak-to-peak voltage applied to the transfer nip is constant when the toner image is transferred to the transfer target object;

control the plurality of test toner images to be transferred to the transfer target object under transfer conditions different from each other in combination of a DC current value and a peak-to-peak voltage value, while changing the DC current and the peak-to-peak voltage in the processing mode; and determine the DC current value and the peak-to-peak voltage value to be used in the print job by the processing mode.

3. The image forming apparatus according to claim 2, further comprising an electric-current sensor to detect an electric current flowing through the transfer nip, wherein the processing circuitry is to perform the constant-voltage control and the constant-voltage control based on a detection result of the electric-current sensor.

4. The image forming apparatus according to claim 1, wherein the transfer target object is a recording sheet, and wherein the plurality of test toner images are formed on the recording sheet along a conveyance direction of the recording sheet under the transfer conditions different from each other in combination of the DC component and the AC component.

5. The image forming apparatus according to claim 1, further comprising an information input device to input information, wherein the transfer target object is a recording sheet, and wherein the processing circuitry is to determine the DC component and the AC component to be used in the print job, based on evaluation information of the plurality of test toner images input to the information input device, in the processing mode, the evaluation information indicating evaluation of an image quality of the plurality of test toner images transferred on the recording sheet.

6. The image forming apparatus according to claim 1, further comprising a latent image bearer to bear the toner image, wherein the image bearer is an intermediate transferor to which the toner image is primarily transferred from the latent image bearer.

7. The image forming apparatus according to claim 1, wherein the transfer target object is a recording sheet, wherein the processing circuitry is to determine whether the transfer bias to be used in the print job is the transfer bias in which the AC component is superimposed on the DC component or a transfer bias including only the DC component, according to a type of the recording sheet, and wherein when the recording sheet used in the processing mode is a recording sheet for which the transfer bias including only the DC component is used in the print job, the processing circuitry is to turn off the AC component in the processing mode, control the plurality of test toner images to be transferred to the recording sheet under transfer conditions different from each other only in the DC component, and determine only the DC component to be used in the print job.

8. The image forming apparatus according to claim 1, wherein the processing circuitry is to:

in the processing mode, control a plurality of full-color test toner images and a plurality of monochrome test toner images to be transferred to the transfer target object under the transfer conditions different from each other in combination of the DC component and the AC component; and in the processing mode, determine the DC component and the AC component to be used in a full-color print job, based on the plurality of full-color test toner images, and determine the DC component and the AC component to be used in a monochrome print job, based on the plurality of monochrome test toner images.

9. The image forming apparatus according to claim 8, wherein the processing circuitry is to:

in the processing mode, form the plurality of full-color test toner images on a front surface and a back surface of the transfer target object;

determine the DC component and the AC component to be used when a full-color toner image is transferred on the front surface of the transfer target object, based on the plurality of full-color test toner images on the front surface of the transfer target object; and determine the DC component and the AC component to be used when the full-color toner image is transferred on the back surface of the transfer target object, based on the plurality of full-color test toner images on the back surface of the transfer target object, and wherein the processing circuitry is to:

in the processing mode, from the plurality of monochrome test toner images on the front surface and the back surface of the transfer target object;

determine the DC component and the AC component to be used when a monochrome toner image is transferred on the front surface of the transfer target object, based on the plurality of monochrome test toner images on the front surface of the transfer target object; and determine the DC component and the AC component to be used when the monochrome toner image is transferred on the back surface of the transfer target object, based on the plurality of monochrome test toner images on the back surface of the transfer target object.

* * * * *